Oct. 28, 1952          I. KAMEN          2,615,948

COUPLER FOR WAVE TRANSMISSION LINES

Filed Nov. 3, 1949          5 Sheets-Sheet 1

INVENTOR.
IRA KAMEN
BY
John J. Rogan
ATTORNEY

Oct. 28, 1952 — I. KAMEN — 2,615,948
COUPLER FOR WAVE TRANSMISSION LINES
Filed Nov. 3, 1949 — 5 Sheets-Sheet 3

INVENTOR.
IRA KAMEN
BY John J. Rogan
ATTORNEY

Oct. 28, 1952          I. KAMEN          2,615,948

COUPLER FOR WAVE TRANSMISSION LINES

Filed Nov. 3, 1949          5 Sheets-Sheet 4

INVENTOR.
IRA KAMEN
BY John J. Logan
ATTORNEY

Oct. 28, 1952     I. KAMEN     2,615,948
COUPLER FOR WAVE TRANSMISSION LINES
Filed Nov. 3, 1949     5 Sheets-Sheet 5

INVENTOR.
IRA KAMEN
BY John J. Rogan
ATTORNEY

Patented Oct. 28, 1952

2,615,948

UNITED STATES PATENT OFFICE 2,615,948

COUPLER FOR WAVE TRANSMISSION LINES

Ira Kamen, New York, N. Y., assignor to Commercial Radio-Sound Corp., New York, N. Y., a corporation of New York Application November 3, 1949, Serial No. 125,306

10 Claims. (Cl. 173—324)

This invention relates to wave transmission line systems, and more especially it relates to couplers or junctions for such lines and also to grounding and impedance terminating arrangements for such lines.

A principal object of the invention is to provide a novel coupler for wave transmission lines of the type having inner and outer conductors, whereby one or more load devices, such for example as radio apparatus, can be efficiently coupled to the line.

Another principal object is to provide a novel wave branching device for wave transmission line systems, and the like, whereby the coupling of one or more load devices, terminating devices, or grounding devices, for the line, can be expeditiously effected by non-expert personnel, and without disturbing the predetermined wave impedance conditions of the system.

Another principal object is to provide novel means whereby a load device can be conductively coupled to the inner and outer conductors of a line, for example a line of the coaxial or other type having inner and outer conductors.

A further object is to provide a novel branch coupler arrangement for lines of the inner and outer conductor type, whereby any desired number of load devices can be coupled to the line without disturbing the conductive continuity of the line during the installation of a coupler, and without undesirably changing the predetermined impedance or wave transmission characteristics of the line after the installation of the coupler as compared with such characteristics before the installation.

A feature of the invention relates to a novel branch coupler for inner and other conductor transmission lines, which coupler does not require special dimensional design in so far as its electrical wave impedance characteristics are concerned, since neither the peripheral contour of the outer conductor nor the continuity of the inner conductor or conductors of the line are disturbed during the coupler installation.

Another feature relates to a novel branch coupler for a multi-junction coaxial line system, which coupler does not rely for its effectiveness or electrostatic pick-up, and which can be operatively installed by any competent mechanic without likelihood of disturbing the operation of other devices which have been previously coupled to the line and without disturbing the concentricity of the line. This feature is of special importance in such installations as are required in apartment houses, hotels, hospitals, and the like, where the devices to be operated in the various rooms and locations are of the video or radio frequency type, for example television receivers, frequency modulation receivers, and the like. Heretofore, in order to "cut-in" a receiver at any particular location, it was necessary for the installer, during some stage of the "cut-in," to sever one or both of the coaxial line conductors. During the severance interval, the remaining sets which had been previously coupled to the line, would have their operation interfered with. The present invention, therefore, lends itself peculiarly well to such multiple branch systems, which can be installed either as an original part of the building construction, or as a later installation.

Another feature of the invention relates to a novel branch coupling unit for radio and video systems which unit is capable of expeditious installation in a standard wall outlet or junction box.

A further feature relates to a novel outlet or junction box for coupling radio apparatus or the like to a wave transmission system of the kind employing transmission lines of the inner and outer conductor type.

A further feature relates to the novel organization, arrangement and relative interconnection of parts which cooperate to provide an improved rugged and easily installed branch coupler for wave transmission line systems and without requiring severing or subsequent soldering of the severed line conductors while maintaining the desired concentricity of the line and its non-hygroscopic character.

A still further feature relates to an improved lightning arrester or grounding unit for attachment to a coaxial line.

Other features and advantages not particularly enumerated, will be apparent after a consideration of the following detailed descriptions and the appended claims.

In installations of video, radio and television distribution systems where a coaxial cable transmission line must be tapped at various places along such line to transfer energy to video, radio or television outlets or receivers, such taps, when made by conventional methods, produce a change in the concentric nature of the inner and outer conductor of the coaxial transmission line, causing a change in the characteristic impedance of the transmission line. This change of impedance in the transmission line causes standing waves along the line, which dissipate the video, radio and television energy being transmitted therealong. The amount of loss of energy is dependent upon the impedance changes produced by the number and nature of the taps, especially where the taps distort or change the concentricity or symmetrical continuity of the conductors. In the case of television and video, the signals will be distorted by standing waves, and this distortion is manifested as duplicate pictures on the television screen, marring the quality of the reception. In the case of standing waves on radio systems, the signals may be reduced seriously, and a type of phase distortion may be introduced which will distort the audio reception from a receiver connected to the system. Standing waves on transmission lines employed in radio measuring device systems such as radar and guided missile systems, upset the accuracy of these systems because of signal losses, phase shifts and distortions which result when standing waves appear on transmission lines which carry complex wave information.

Figure 1:
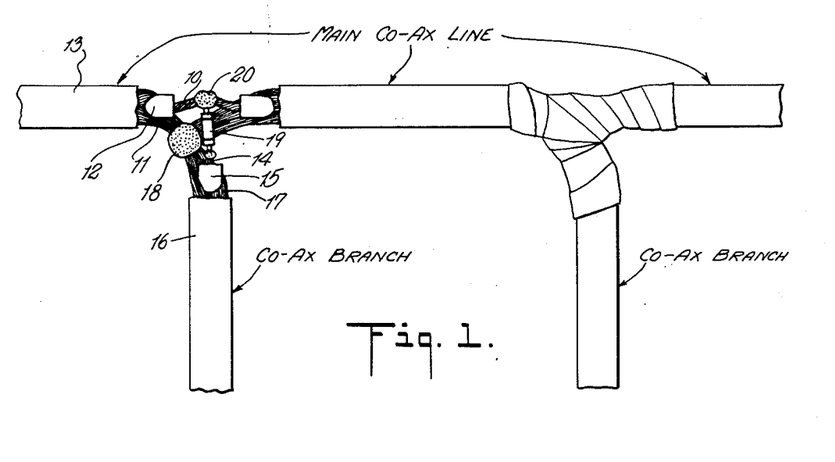
Fig. 1 illustrates one of the conventional branch junctions of a coaxial line system.

While various methods and means have been proposed heretofore for making direct conductive connections to the conductors of a coaxial transmission line, they have in all cases involved the severance of one or more of the line conductors. Thus one conventional method is illustrated in Fig. 1 of the drawing, wherein the main coaxial line consists of the inner or central conductor 10 and the concentric tubular or outer conductor 11, with the space between the two conductors filled by a suitable solid dielectric 12. The outer conductor 11 is usually provided with an exterior moisture-proof and insulating sheath 13. In order to effect the connection of a branch to the main coaxial line, it is necessary to strip off a length of the insulating sheath 13 to expose the outer conductor 11 which must thereupon be severed or distorted out of its normal cylindrical or tubular shape so as to provide access to the dielectric 12. Thereupon an appropriate length of the dielectric 12 must be stripped away in order to expose the inner conductor 10. The branch coaxial line must also have its inner conductor 14 exposed by removing part of the dielectric 15, and the exterior insulating sheath 16 must be removed or skinned to expose the outer conductor 17. Furthermore, the outer conductor 17 must be distorted so that it can be soldered, for example at 18, to the distorted or severed outer conductor 11 of the main coaxial line section. Likewise the inner conductor 14 must usually be soldered to an isolating resistor 19, which in turn must be soldered, for example at 20, to the inner conductor 10 of the main line. When the soldering has been completed, it is of course necessary to make sure that the exposed inner and outer conductors of the main line and of the branch line, do not short-circuit each other. One manner of accomplishing this, is to fill the space between the conductors with a suitable insulating compound which hardens. The other is to wrap an insulating tape between and around the various conductors, as illustrated in the finished joint at the right-hand portion of Fig. 1. It will be observed that with this arrangement, the electrical parameters of the line are considerably distorted. It is well nigh impossible to make the soldered joints so that the inner conductor remains coaxial with the outer conductor, and it is almost impossible to make sure that the outer conductor when the joint is finished, is in a cylindrical or tubular shape around the joint. Furthermore, since a portion of the original dielectric material 12 and 15 has been removed the dielectric properties of the transmission line at the junction are correspondingly changed. Furthermore, it is extremely difficult to effect a proper soldered joint without materially increasing the diameter of the inner and outer conductors by reason of the solder itself. Because of the relatively confined space within which the soldering must be done, this method of branching is rather unsatisfactory when the line 13 passes through the conventional junction or outlet box which forms an integral part of a building construction. In such arrangements, the working space for soldering is rather limited, and there is always the danger of loose solder entering between the two concentric conductors so that each joint requires careful inspection. Furthermore, the heat necessary to effect the soldering may also destroy the dielectric properties of the adjacent ends of the dielectric 12. It is clear, therefore, that with such a joint, the wave impedance characteristics of the main transmission line are materially affected, and may seriously increase the standing-wave-ratio along the main line. These difficulties will of course be increased as the number of such joints is increased. Another difficulty with the conventional joint of Fig. 1, is that it is well nigh impossible to preserve the original non-hygroscopic continuity of the outer insulating sheath 13. It has been found therefore that with such joints, they are subject to aging resulting in a great part from moisture entering the transmission line at the junction points.

Figure 2:
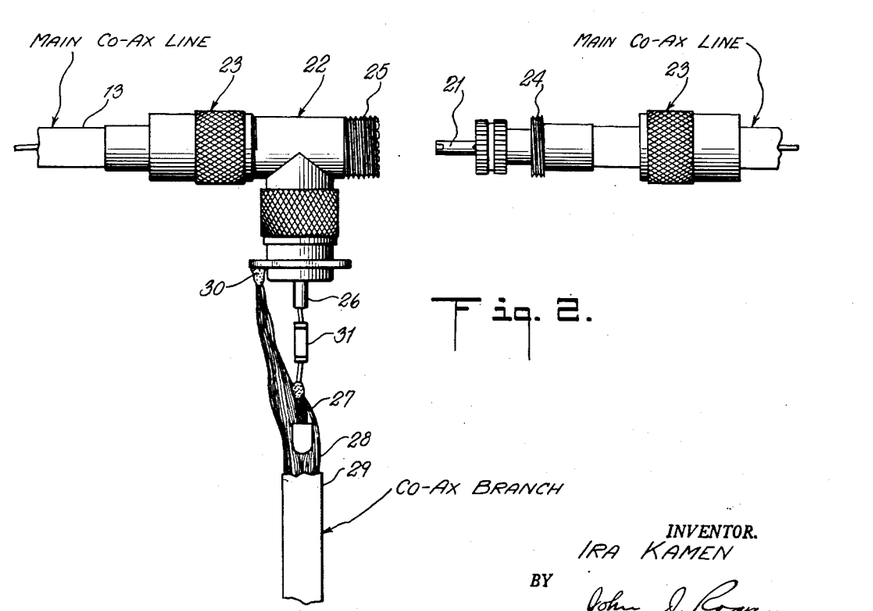
Fig. 2 represents another but more elaborate conventional branch junction for a coaxial line system.
Figures 3, 4, 5, 6:
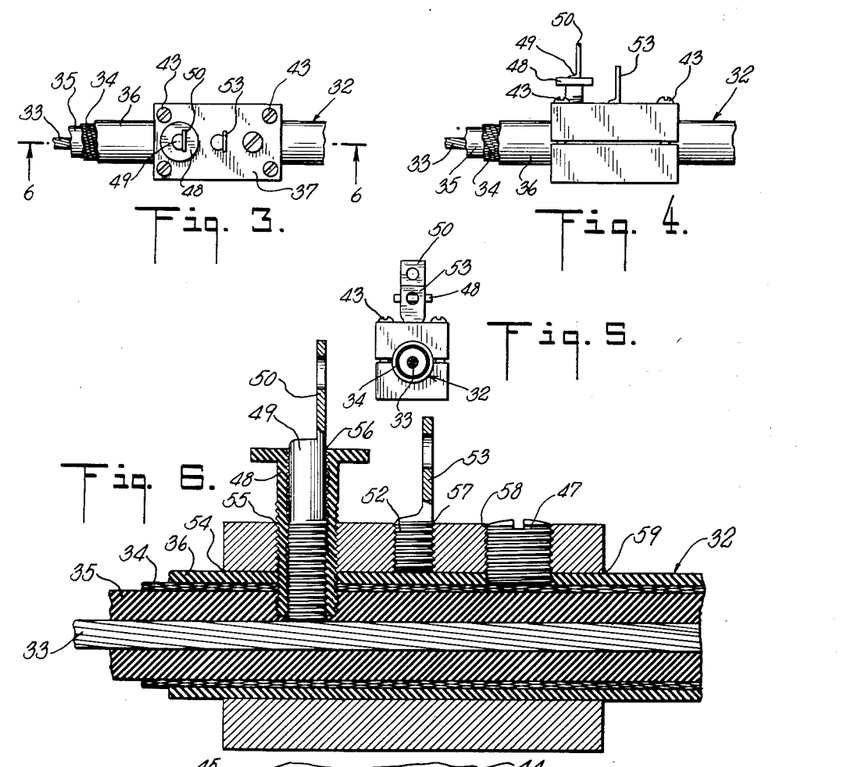
Fig. 3 is a top plan view of a junction coupler according to the invention.
Fig. 4 is a front view of Fig. 3.
Fig. 5 is a right-hand end view of Fig. 3.
Fig. 6 is a sectional view of Fig. 3, taken along the line 6—6 thereof.
Figure 7:
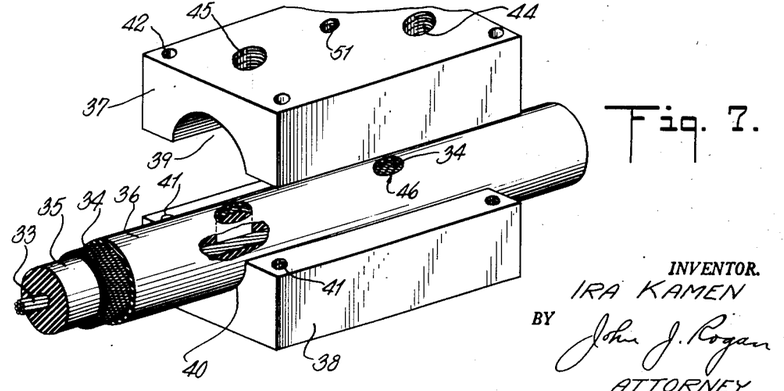
Fig. 7 is a perspective exploded view of the coupler with certain parts omitted.

In an effort to overcome some of these difficulties, it has been proposed to use a tubular metallic T coupling such as shown in Fig. 2. However, even in this manner of coupling, the cable or coaxial line must be completely severed at both its inner and outer conductors, and after the two ends of both conductors are skinned, the inner conductor at each end must be carefully soldered to its respective pin connector 21, and if this soldering is effected with too much heating, it affects the dielectric casing or sheath 13. After this soldering, each pin end 21 must be carefully plugged into the double-ended T union 22, whereupon the internally-threaded members 23 are threaded on to the cooperating threaded portions 24 and 25, to hold the parts together rigidly as a unit. The T union 22 carries a similar central prong 26 which is to be connected to the center conductor 27 of the branch coaxial line, the outer conductor 28 of which must be connected to the outer casing of the T junction 22. Here again, in order to effect the proper connections, it is necessary to strip the outer sheath 29 and to distort the outer conductor 28 so that it can be soldered at 30 to the casing of union 22. Likewise the center conductor 27 must be connected to the pin 26 through the usual isolating resistor 31 which must be soldered at opposite ends to pin 26 and to conductor 27. Apart from the expensive nature of the fittings necessary for such a joint, it has been found that the various soldering operations are relatively difficult to perform and usually require considerable time of skilled technicians. In any event, because of the lack of continuous concentricity between the inner and outer conductors 27 and 28 at the junction, the likelihood of impedance change and undesired standing-wave-ratio on the line will develop. Here again the finished junction must be enclosed in a wrapping of insulating tape or insulating compound.

The present invention has for one of its objects to provide a conductive coupling device which overcomes the difficulties of the foregoing described junctions. It also has for its object the effecting of one or more such junctions by relatively unskilled personnel and in a few minutes time, with a minimum of physical and electrical disturbance of the transmission characteristics of the main coaxial line, while requiring only a few simple and readily available tools, without any need for severing or cutting the inner or outer conductor of the coaxial line, and without performing any soldering operations.

Referring to Figs. 3–7, the numeral 32 represents any well-known form of concentric transmission line or cable, such for example as a coaxial wave transmission line, comprising the usual center conductor 33 with its concentric tubular outer conductor 34 and intervening dielectric 35, the line being provided with the usual outer moisture-proof insulating sheath 36. The coupling unit according to one phase of the invention comprises two rectangular metal clamping blocks 37, 38, with their opposed faces each provided with a semi-circular recess or groove 39, 40, extending throughout the length of the block. The grooves or recesses 39, 40, have substantially the same curvature as the outer curvature of the sheath 36, but the thickness of each block is slightly less than the radius of the sheath 36, so that when the blocks are fastened together, they firmly grip and clamp against the outer sheath 36. For the purpose of effecting this clamping, the block 38 has at each corner thereof an internally-threaded recess 41, and the corresponding corners of the block 37 have unthreaded transverse bores 42 through which freely pass the clamping screws 43 for threaded engagement with the corresponding recesses 41 (see Figs. 3 and 4). The blocks 37 and 38, in addition to acting as rigid clamping members, also serve as dies and guides for the reception of a drill or routing tool for removing at one localized point along the coaxial line a small portion of only the outer sheath 36, to expose the outer conductor 34, while at another localized point along the line, a small portion of the outer sheath 36, as well as outer conductor 34 and dielectric 35, to expose the inner conductor 33. In order to effect this removal, the block 37 is provided with two spaced transverse and internally-threaded bores 44, 45. The coaxial line cable is laid in the recess 40 of the lower block 38, and the upper block 37 is then placed over the line with the upper half of the line periphery seated in the recess 39. The screws 43 are then fastened to tightly clamp the line between the two blocks. With the blocks thus clamped in place, a suitable drill or routing tool is inserted through the bore 44 and to a depth sufficient to make a circular hole 46 in only the outer sheath 36, thus exposing the outer conductor 34 at this point. This drill or routing tool should be of a predetermined length with respect to the thickness of the block 37 and the thickness of sheath 36, so as to limit the drilling or routing action to the thickness of the said sheath 36, so as to insure that the conductor 34 is not cut-through or distorted. Likewise, the drill or routing tool is then passed through the bore 45, but this time the tool is gauged in length so that it bores not only through the sheath 36, but also through the conductor 34 and the dielectric 35, to expose the conductor 33. Here again the length of the drilling tool should be correlated with the thickness of the block 37 and the thickness of the elements 34, 35 and 36, so that the hole is drilled to exactly the right depth, to expose the inner conductor 33 without distorting this latter conductor in any way. By means of blowers, tweezers, or the like, the drilled material can be easily removed from the drilled hole and thence through the bores 44 and 45. When both drilling operations have been completed, a suitable set screw 47 is threaded through the bore 44 until it engages the conductor 34. In order to avoid any distortion of this conductor by the set screw 47, the tip of the set screw which engages the conductor 34, is provided with a soft metallic layer or coating such as gold plating or other metal or alloy which does not have any corroding action with the metal 34.

Thereafter an internally and externally threaded insulator bushing 48, for example of "Lucite," "polystyrene," or other suitable insulator whose dielectric constant is the same or mated to the dielectric constant of the dielectric 35, is threaded through the bore 45, until it engages the conductor 33. A threaded screw 49, carrying an integral eyeletted connecting lug 50, is threaded through the sleeve 48, until the tip of the screw 49 engages the conductor 33. In order to prevent distortion of the conductor 33, the tip of the screw 49 is preferably provided with a coating or layer of soft conductive material, such as gold plating or the like, which also inhibits corrosion between the contacting surface of the screw and the conductor 33. The block 37 also has another internally-threaded transverse bore 51 which is adapted to receive a threaded screw 52 having an integrally eyeletted connection lug 53. The inner conductor of a coaxial branch line can then be connected to the lug 50, and the outer conductor of this branched line can be connected to the lug 53.

It will be clear, therefore, that with this method of coupling, none of the conductors or sheaths of the coaxial line has its cylindrical contour distorted, and to all intents and purposes, the main coaxial line remains completely symmetrical and concentric at the region where the branching connections are to be made. Furthermore, the actual connections to the conductors of the main coaxial line 32 are effected without using solder. Furthermore, since the holes which are drilled through the layers of the line as above described, are subsequently closed by the screw 47 and the bushing 48 with its screw 49, the line maintains its non-hygroscopic sealed character. It will be understood, of course, that if desired, a suitable moisture-proof sealing compound or cement can be wiped or painted around the regions 54—59 to provide further protection against moisture entering the line. Instead of using cements for this purpose, the various joints can be sealed by suitable moisture-proof gaskets, although for all normal uses these sealing gaskets and cements have been found to be not absolutely necessary.

Figure 8:
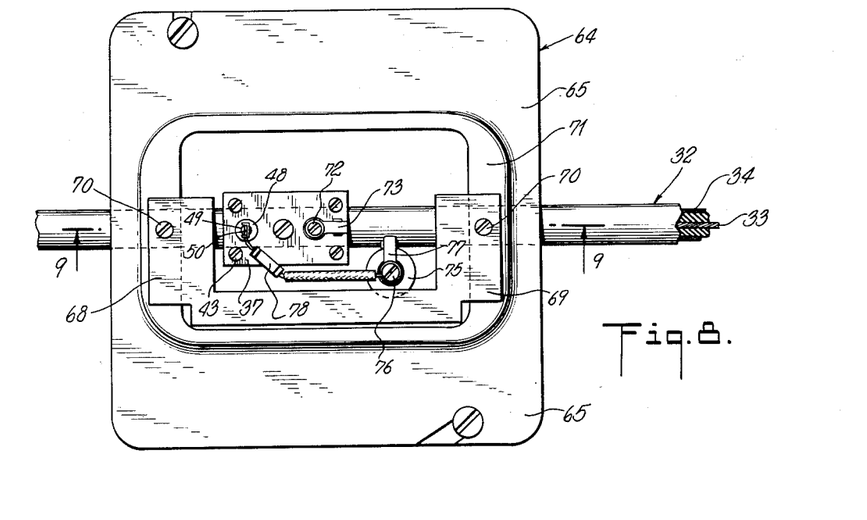
Fig. 8 is a top plan view of a coupler device according to the invention, assembled as a unit for direct installation in a standard junction or outlet box.
Figure 9:
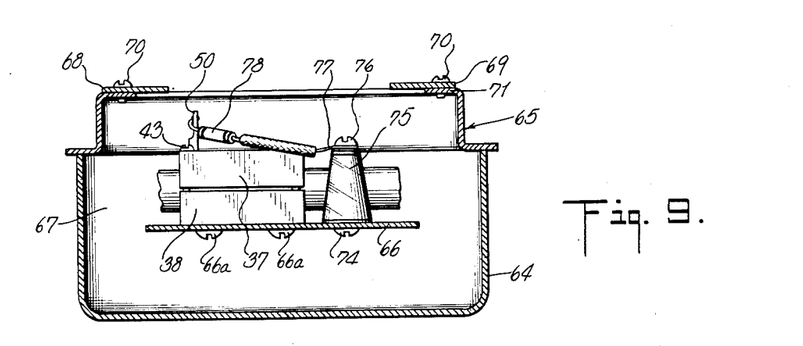
Fig. 9 is a sectional view of Fig. 8, taken along the line 9—9 thereof.
Figures 10, 11, 12:
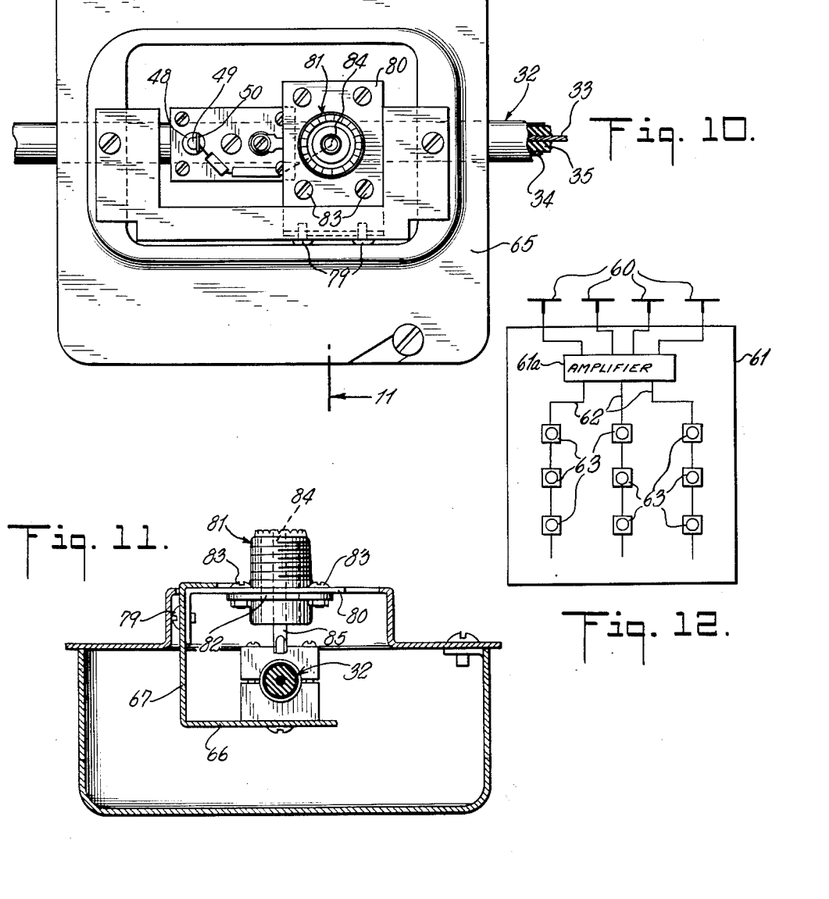
Fig. 10 is a modification of Fig. 8, wherein a standard coaxial line outlet is also provided as an integral part of the coupler unit.
Fig. 11 is a sectional view of Fig. 10, taken along the line 11—11 thereof.
Fig. 12 is a diagrammatic illustration of a multiple outlet coaxial line system employing couplers according to the present invention.

Referring to Figs. 8 and 9, there is shown how the coupling arrangement of the invention can be assembled as a unitary device for attachment to and location within a standard junction box, such as is conventionally used in lighting and power outlets in the walls of buildings and the like. One of the serious problems that has been encountered in the use of television sets, frequency modulation sets, etc., in apartment houses and similar locations, is that of using a master antenna system for supplying all the sets with the assurance that a large number of sets can be coupled to the master antenna without inter-set interference, and without loss of transmission line efficiency. The present invention simplifies the installation of such multiple sets to a master antenna system. For example, as shown in Fig. 12, a series of antennas 60, each designed for optimum response at a particular channel frequency, such as one of the several television channels, can be installed on the roof of the building 61, and connected by respective coaxial lines to respective amplifier strips in amplifier 61a. Coaxial feed lines 62 can be installed in the usual conduits running down and through the building from the amplifier 61a. At each location within the building walls where a set is to be coupled to the line, there is provided an outlet box and coupling unit 63, shown in detail in Figs. 8 and 9. The box 64 can be of the standard construction suitably and permanently mounted within the wall, and provided with the usual cover plate 65 having the usual rectangular opening. The coupling unit according to the invention, comprises a right-angled metal bracket having a bottom wall 66, a side wall 67 which carries two right-angled lugs 68, 69, for attachment by screws 70 to the flange 71 on cover plate 65. Attached to the wall 66 by suitable screws 66a, is the metal block 38 similar to the corresponding block 38 of Figs. 3–7. Fastened to block 38 by screws 43 at each of the four corners, is the complementary clamping block 37. Threaded through the block 37 is the insulator bushing 48 through which is threaded a metal screw 49 which is designed to contact with the inner conductor 33 of the coaxial line 32 as above described. Also threaded through the block 37 is the screw 72 which is similar to screw 47, for making contact with the outer conductor of the coaxial line, except that the screw 72 has a flanged head to fasten in place a connecting lug 73.

Fastened to wall 66 by screw 74, is a stand-off insulator 75 into the upper end of which is threaded the screw 76 for fastening in place the connector lug 77. The usual isolating resistor 78 has one end soldered to lug 50, and the other end soldered to lug 77. Thus there is provided a pre-assembled branch coupling unit which is readily installed in the conventional receptacle box 64. The manner of making contact with the inner and outer conductors 33, 34, of the coaxial line, will be clear from the description given above in connection with Figs. 3–7. The branch line can then have its inner and outer conductors readily soldered to the lugs 73, 77. Since it is not necessary to sever and rejoin the conductors of the main line 32, the soldering of the conductors of the branch line to the lugs 73 and 77, can be easily accomplished and without any danger of destroying or rupturing the dielectric or the insulation sheath of the main line 32.

In some cases it may be desired to avoid the necessity of soldering the conductors of the branch line to the coupling device. Accordingly, there is shown in Figs. 10 and 11 a modification of Figs. 8 and 9. The parts of Figs. 10 and 11 which are identical with corresponding parts in Figs. 8 and 9 and with corresponding parts in Figs. 3–7, are designated by the same numerals in the respective figures. In Figs. 10 and 11, the stand-off insulator 75 shown in Figs. 8 and 9, is deleted. Attached to the side wall 67 of the metal bracket by means of screws 79 is another small right-angled metal bracket 80 having a central circular opening through which projects the conventional coaxial female coupler 81 carried by plate 82 which is fastened to bracket 80 by screws 83. The center conductor 84 of this coupler terminates in a connection lug 85 to which one end of the usual isolating resistor 78 is connected, the other end of this resistor being connected to the lug 50. The apparatus which is to be coupled to the main coaxial line 32, is of course provided with a conventional coaxial male coupling member similar to the member shown in the right-hand portion of Fig. 2, and having a central conductor which terminates in a plug-in pin similar to pin 21, that can be plugged into the corresponding central hollow conductor 84 in the member 81. The outer conductors of the branch line, and the coupler 81, are electrically joined by the threaded sleeve such as the sleeve 23 of Fig. 2.

While in the foregoing, reference has been made to the use of the coupling device for connecting load devices, such as radio receivers to the transmission line, it will be understood, of course, that the invention is not limited to any particular kind of load device. For example, the coupling device may be used to connect one or more radio frequency sources to the line.

Figure 13:
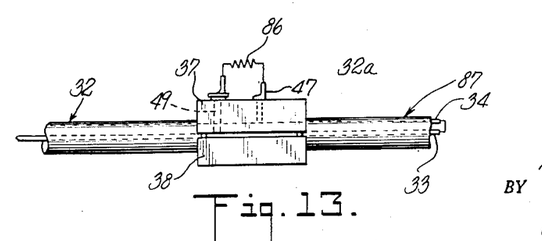
Fig. 13 shows a coupling device used as an impedance match termination element.

The coupling device also can be used to control the termination of a coaxial line without disturbing the non-hygroscopic quality thereof. For example, there is shown in Fig. 13 a typical coaxial line 32 which may be a 70-ohm coaxial line, in which case the inner and outer conductors 33 and 34 are bridged by a 70-ohm terminating resistance 86. If this line with its resistor termination 86 were connected to the usual slotted-line device for checking standing waves, and the line were checked for impedance match over a wide range of ultra-high frequencies, it would be found that at some particular frequency, the termination appears resistive. This is the resonant frequency of the resistor per se; above and below this frequency the resistor has an inherent capacitive or inductive component, and therefore it does not match the line impedance. In other words, the resistor is not a pure resistance at all ultra-high frequencies. At any particular operating frequency of the line, the terminating resistor may have a shunt capacitance produced by the leads from the resistor. Therefore, if an inductive section of transmission line is connected to the termination, it can be adjusted to resonate with the said capacitance of the terminating resistor to look like a parallel tuned circuit. The line therefore instead of seeing a terminating resistance with a shunt capacitance, now sees a terminating resistance with a shunt parallel tuned circuit. A parallel tuned circuit looks like a very high resistive impedance, and therefore it has very little effect on the total terminating resistance. If the combined terminating resisance and shunt resonant matching load are properly correlated, the line impedance will be matched at the required operating frequency.

As shown in Fig. 13, the coaxial line 32 has clamped thereto a coupling unit such as illustrated in Figs. 3–7. The contact probing screw 49 makes contact with the center conductor 33, and the other contact probing screw 47 makes contact with the outer conductor 34. The blocks are attached to the line so that the stud terminating section 32a extends a predetermined distance beyond the resistor 86. The conductors 33 and 34 at the far end of matching line section 32a are directly connected together or short-circuited, and the line section 32a is cut so that its length is less than a quarter wavelength at the desired operating frequency of line 32. Under these conditions the line section 32a looks like an inductance. The optimum adjustment can be made by cutting small pieces from the end of section 32a, while maintaining the conductors 33, 34, short-circuited at the cut end until the proper impedance match is indicated. If it should be desired to add capacitance to balance out the inherent inductance of the terminating resistor 86, the line section 32a can be left electrically open at its far end and trimmed to a length less than a quarter-wavelength at the operating frequency of line 32.

Figure 14:
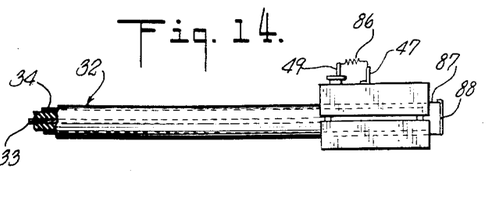
Fig. 14 is a modification of Fig. 13.

The invention of course is not limited to the use of a quarter-wave line section to balance-out the inherent inductance or capacitance of the matching resistor. Thus at lower frequencies of transmission, for example up to 200 megacycles per second, the inherent inductance or capacitance of the resistor may be of negligible effect. Accordingly, as shown in Fig. 14, the matching resistor 86 and the coupling unit can be mounted closely adjacent the end 87 of the line which is provided with a plug or cap 88 for sealing the end of the line to maintain its non-hygroscopic qualities. In all of the foregoing embodiments it will be understood that whenever the line is trimmed, cut, or otherwise physically shortened, this cut end should be hermetically sealed by a suitable plug or cap.

Figure 15:
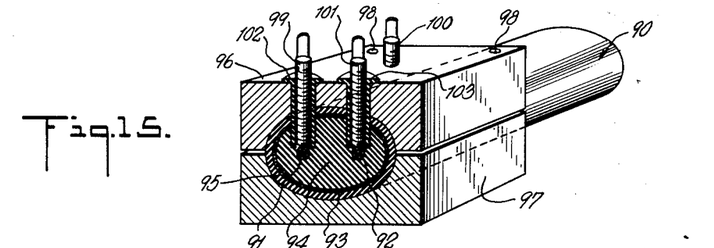
Fig. 15 shows the invention applied to a transmission line of the balanced twin-shielded conductor kind.

The invention of course is not limited to a transmission line of the concentric type having a single inner conductor, but is also applicable to any other video or radio frequency transmission line having two or more inner conductors and an outer conductor. Thus as shown in Fig. 15, the line 90 may be of the well-known balanced shielded type comprising a pair of spaced parallel inner conductors 91, 92, which are surrounded by a common outer conducting sheath 93 and with suitable dielectric 94 within the sheath to maintain the conductors 91, 92, in fixed parallelism with respect to the sheath. Usually, although not necessarily, the sheath 93 has an outer covering 95 of non-hygroscopic insulating material. In order to couple to such a line, there are provided two metal blocks 96, 97, each having a corresponding groove so that when the blocks 96 and 97 are assembled and fastened by the screws 98, they form a channel to receive the balanced line and to grip the said line at the location where the coupling is to be effected. The blocks 96 and 97 are therefore similar to the corresponding blocks 37, 38, of Figs. 4 to 7, and the block 96 has corresponding openings to receive the drilling tool above-mentioned and to permit the insertion of the contacting screws 99, 100, which make conductive contact respectively with the conductor 91 and the sheath 93. In addition, a separate hole is provided in the block 96 for drilling through the covering 95, sheath 93, and dielectric 94, to provide a through-passage to the other conductor 92. A separate contact probing circuit 101 passes through this opening, so as to make contact with the conductor 92. It will be understood, of course, that the probing screws 99 and 101 are insulated from the block 96 and the sheath 93 by respective insulator bushings 102, 103.

The invention furthermore is not limited to wave transmission lines of the type having a solid dielectric on the interior thereof. Certain types of coaxial lines have an air or gas dielectric. Such a line is illustrated in section in Fig. 16, comprising an inner central conductor 104, the outer tubular conductor 105, and the external moisture-proof insulating sheath 106. In order to prevent distortion or offsetting of the conductor 104 when the probing contact screw is inserted, and also to prevent distortion or offsetting of the conductor 104 when the drilling operation is taking place, it is necessary to provide a rigid backing support for this central conductor at the drilling point. This can be effected by providing the lower block 38 with an opening through which passes a screw 107 of sufficient length to engage the conductor 104 without distorting or offsetting that conductor. The screw 107, if desired, can have a suitable mark on its side to indicate the precise part of its length which must be screwed through the block 38 so that its tip just engages the conductor 104. The drilling of the block 37 for the opening to receive the insulator bushing 48 and subsequently to receive the probing screw 49, can be effected without causing any distortion or offsetting of the conductor 104 which is now backed by the tip of screw 107. For a detailed description of the structure of the blocks 37 and 38, and the manner of assembling them and forming the openings for the probing screws, reference may be had to the description accompanying Figs. 3 to 7 above.

Figures 16, 17, 18:
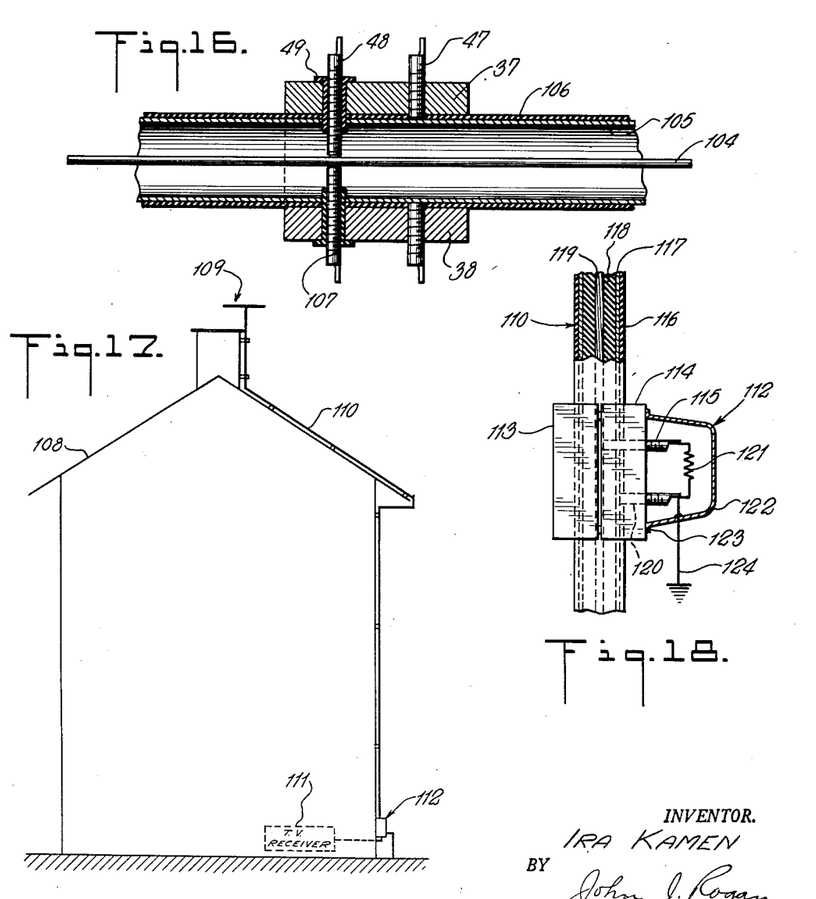
Fig. 16 shows the invention applied to a coaxial line of the type having a non-solid dielectric between the inner and outer conductors.
Fig 17 shows a grounding or lightning arrester unit for a coaxial line.
Fig. 18 is an enlarged view, partly sectional, of the arrester unit of Fig. 17.

One of the practical difficulties that has been encountered in coaxial line installations is that of connecting a lightning arrester to the line, without changing the impedance characteristic of the line, or without producing undesirable standing waves. Fig. 17 shows in schematic form any suitable building 108 on the roof of which is mounted a suitable television receiving antenna 109 connected by a coaxial line 110 to a television receiver 111. Adjacent the lower end of the line 110, there is connected a lightning arrester 112 according to the invention. This lightning arrester is shown in detail in Fig. 18, and comprises a pair of opposed metal blocks 113, 114, which have opposed channels and are clamped around the line 110 adjacent the lower end thereof. The blocks 113 and 114 may be similar in construction to the blocks 37 and 38 of Figs. 3 to 7. The block 114 carries the probing screw 115 with an insulating bushing that passes through the outer insulation covering 116, the outer conductive sheath 117, and the dielectric 118, to the inner conductor 119. The other contact probing screw 120 is threaded through the block 114 and passes through the covering 116 into direct contact with the conductive sheath 117. The manner of forming the bores in the block 114, and the manner of making contact between the screws 115 and 120 and the respective conductors of the line 110, are described above in connection with Figs. 3 to 7. Bridged across the outer ends of screws 115 and 120 is a resistor 121 having a suitable high resistance as compared with the characteristic resistance of the line 110. For example, if the line 110 is a seventy-ohm coaxial line, the resistor 121 may have a resistance of one-thousand ohms. The outwardly projecting ends of the screws 115 and 120, as well as the resistor 121, are enclosed in a metal cover 122, which can be removably attached to the block 114 in any convenient manner, preferably with an intervening moisture-proof gasket 123. The screw 120 can be directly connected to the cover 122, which in turn can be connected to a metal strap 124 or other direct ground connection.

While certain particular embodiments have been described herein, it will be understood that various changes and modifications may be made therein without departing from the spirit and scope of the invention.

What is claimed is:

1. An outlet box for coaxial line attachments, comprising a metal junction box through which a coaxial line passes, a metal bracket for attachment to said box and having a platform member located within the box, a pair of opposed metal blocks supported from said platform and having complementary grooves defining a channel for the coaxial line, means to clamp said blocks around said line, a contact screw threaded through one of said blocks and extending transversely through said line and terminating in conductive electrical contact only with the inner conductor of said line, another contact screw threaded through said block and terminating in conductive electrical contact only with the outer conductor of said coaxial line, a coaxial line coupling element carried by said bracket and extending outwardly beyond the front of said box, and means connecting the center conductor of said element to the first-mentioned contact screw.

2. Apparatus for coupling to a transmission line of the inner and outer surrounding conductor type without substantially affecting the spacing of said conductors, comprising a pair of blocks, means to clamp said blocks in opposing relation around and embracing said line, one of said blocks having a preformed tool-guiding bore extending therethrough transversely to the line to receive a tool for forming a passage-way extending radially transversely through the outer conductor of the line and in transverse radial alignment with said inner conductor to permit a contact member to extend through said bore and said passage-way, a contact member mounted in said bore and passage-way in conductive contact only with the inner line conductor, said blocks including means extending into conductive electrical contact only with the outer line conductor.

3. Apparatus according to claim 2 in which said line is of the type having an outer insulation sheath and substantially solid dielectric between the line conductors, and wherein one of said blocks has another preformed bore to receive a tool for boring a single passage through said sheath and terminating at said outer conductor, and another contact member passing through said other bore and terminating in direct conductive contact with said outer conductor only.

4. Apparatus according to claim 2 in which said contact member is in the form of a removable probe having its tip held in contact with said inner line conductor.

5. Apparatus according to claim 2 in which said line is of the type having an outer insulation sheath and with substantially solid dielectric between the line conductors, said preformed bore having an internally threaded bushing therein and said contact member is in the form of a probe threaded through said bushing.

6. Apparatus according to claim 2 in which each of said blocks has a groove correlated with the diameter and curvature of the outer line conductor, means clamping said blocks around said line to define a channel of substantially the same shape and diameter as said line whereby said bore is automatically aligned with said inner conductor when said blocks are clamped around the line.

7. Apparatus according to claim 2 in which said line is of the type having a pair of parallel spaced inner conductors and a single surrounding outer conductor, and said one of said blocks has a pair of preformed tool-guiding bores, each of which extends transversely to the line for forming respective passages in alignment with the respective inner conductors, and contact members extending through said passages into conductive contact only with the respective inner line conductors.

8. Apparatus according to claim 2 in which said line is of the coaxial type, and is provided with a junction box through which the line passes, and means removably attached to said box for rigidly anchoring said line with said blocks and said contact member in fixed relation to the front of said box.

9. Apparatus according to claim 2 in which said line is of the coaxial type, and is provided with a windowed junction box through which said line passes, means rigidly anchoring said blocks to said box in registry with said window, a coaxial branch line coupling device also anchored to said box in registry with said window, and an electrical connection between the center element of said branch coaxial coupling device and said contact member.

10. Apparatus according to claim 2 in which said line is of the coaxial type having the center conductor air-spaced from the outer conductor, each of said blocks having a corresponding preformed tool-guiding bore, and separate contact members passing through each of said bores and each terminating at its inner end in alignment with said inner conductor.

IRA KAMEN.

(References on following page)

REFERENCES CITED

The following references are of record in the file of this patent:

UNITED STATES PATENTS

| Number | Name | Date |
|---|---|---|
| 1,657,249 | Eby | Jan. 24, 1928 |
| 1,924,115 | Ferrell | Aug. 29, 1933 |
| 1,935,313 | Feldman | Nov. 14, 1933 |
| 1,997,804 | Sangers | Apr. 16, 1935 |
| 2,204,175 | Carter | June 11, 1940 |
| 2,253,830 | Winterhalter | Aug. 26, 1941 |
| 2,299,989 | Johnson | Oct. 17, 1942 |
| 2,353,882 | Despard | July 18, 1944 |
| 2,391,880 | Chesus | Jan. 1, 1946 |
| 2,396,119 | O'Neil | Mar. 5, 1946 |
| 2,451,868 | Quackenbush | Oct. 19, 1948 |
| 2,511,524 | Adler | June 13, 1950 |

FOREIGN PATENTS

| Number | Country | Date |
|---|---|---|
| 363,772 | France | Aug. 7, 1906 |

OTHER REFERENCES

"Review of Scientific Instruments," vol. 12, issue 12, page 864, Dec. 1949.